No. 655,800. Patented Aug. 14, 1900.
J. ROCKE.
GRAIN DUMP AND ELEVATOR.
(Application filed Apr. 19, 1900.)
(No Model.) 2 Sheets—Sheet 1.

Witnesses
C. H. Walker
J. F. Riley

John Rocke Inventor
By his Attorneys,
C. A. Snow & Co.

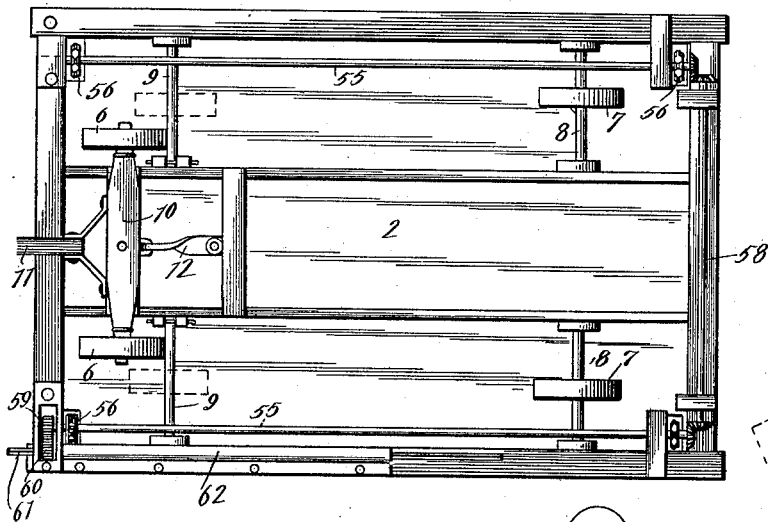

UNITED STATES PATENT OFFICE.

JOHN ROCKE, OF MEADOWS, ILLINOIS.

GRAIN DUMP AND ELEVATOR.

SPECIFICATION forming part of Letters Patent No. 655,800, dated August 14, 1900.

Application filed April 19, 1900. Serial No. 13,513. (No model.)

*To all whom it may concern:*

Be it known that I, JOHN ROCKE, a citizen of the United States, residing at Meadows, in the county of McLean and State of Illinois, have invented a new and useful Grain Dump and Elevator, of which the following is a specification.

The invention relates to improvements in grain dumps and elevators.

The objects of the present invention are to improve the construction of grain-elevators and the means employed for dumping the contents of a wagon into a conveyer leading to the elevator and to provide a simple and comparatively inexpensive apparatus of a portable character adapted to enable cribs and bins to be conveniently filled and capable of being readily transferred from one field or portion of a field to another.

The invention consists in the construction and novel combination and arrangement of parts hereinafter fully described, illustrated in the accompanying drawings, and pointed out in the claims hereto appended.

Figure 1:
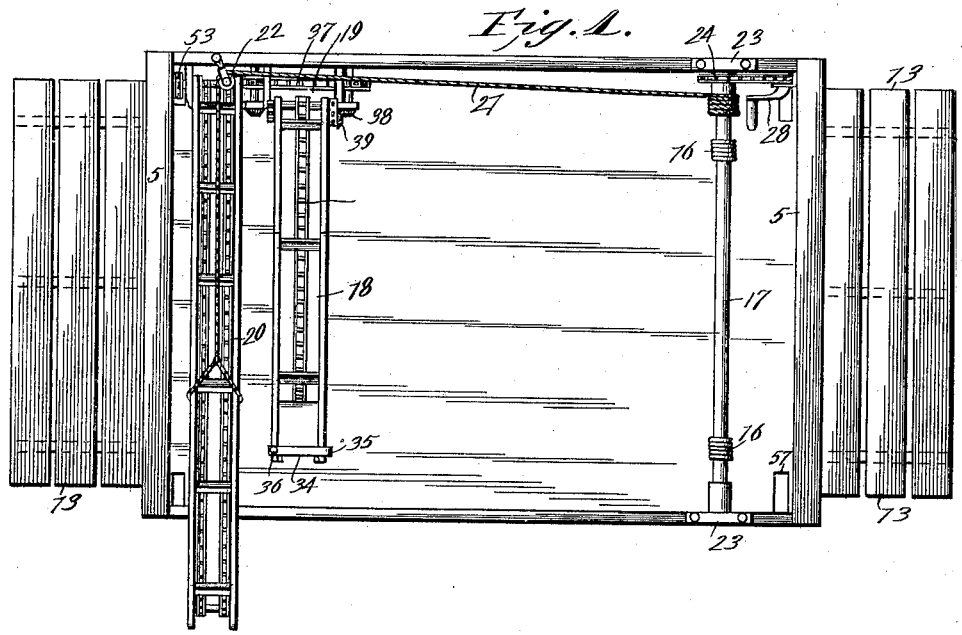
Figure 2:
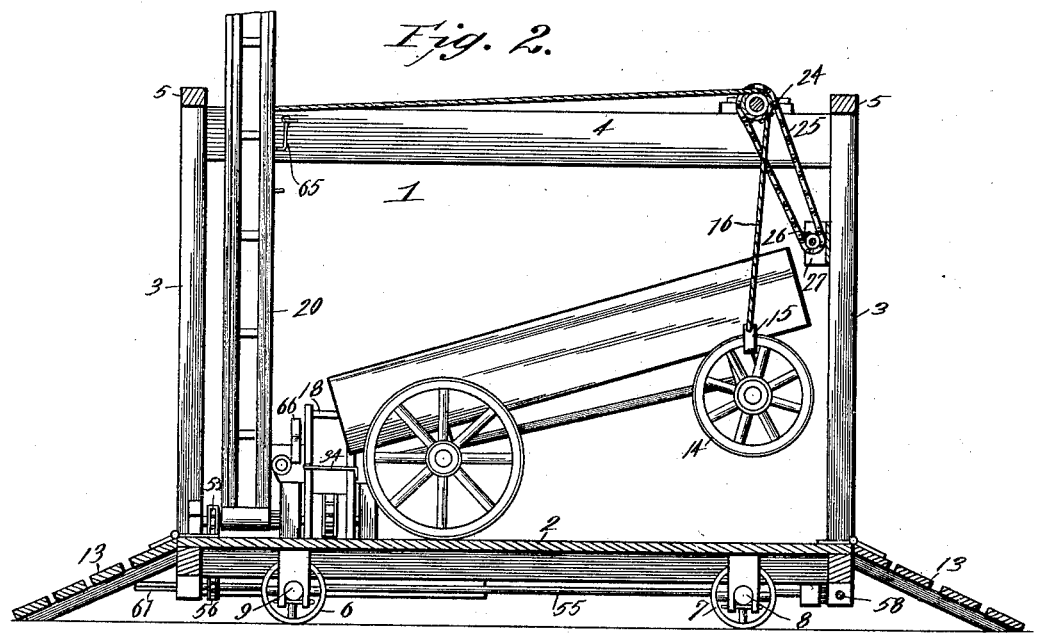

In the drawings, Figure 1 is a plan view of an apparatus constructed in accordance with this invention. Fig. 2 is a longitudinal sectional view of the same, illustrating the manner of dumping a wagon. Fig. 3 is a transverse sectional view of the same. Fig. 4 is a detail sectional view illustrating the arrangement of the gearing for connecting the endless carriers. Fig. 5 is a reverse plan view. Fig. 6 is an end elevation of the transverse conveyer.

Like numerals of reference designate corresponding parts in all the figures of the drawings.

1 designates a portable frame comprising a platform 2, corner posts or uprights 3, and side and end bars 4 and 5, arranged at the top of the frame and connecting the corner posts or uprights. The frame is mounted upon front and rear wheels 6 and 7. The rear wheels, which are located adjacent to the rear corners of the frame, are mounted on short transverse axles 8, and the front of the frame is provided with corresponding short axles 9, adapted to receive the front wheels, as illustrated in dotted lines in Fig. 5 of the accompanying drawings, when the machine is in use, and the arrangement of the wheels at the corners of the frame renders the latter stable and prevents any liability of tilting the same when driving a heavy load of grain thereon. When it is desired to transfer the apparatus from one field to another, the wheels 6 are removed from the short front axles 9 and are arranged on the ends of a short pivoted front axle 10, to which is secured a pole 11, which will enable the apparatus to be turned like an ordinary vehicle. The front axles 9 are detachably mounted on the frame and are adapted to be readily removed to enable the wheels 6 to be arranged on them. When the axle 10 is in use, it is supported by a pivoted reach-bar or brace 12, which is detachably secured at its rear end by means of a suitable pivot to the frame.

The platform is provided at its ends with hinged inclines 13, adapted to permit a wagon to be readily driven on and off it and capable of being folded upon the frame when the apparatus is to be moved. After a wagon has been driven upon the frame its front wheels 14 are connected by hooks 15 with the lower ends of a pair of hoisting ropes or cables 16, which are secured at their upper ends to a transverse shaft 17 and which are adapted to be wound around the same to raise the front portion of the wagon for arranging the body or box thereof in an inclined position, as shown in Fig. 2, for discharging or dumping its contents into a transverse conveyer 18. The material is carried from the transverse conveyer 18 by a short longitudinal conveyer 19 to a pivoted elevator 20, adapted to oscillate back and forth across the frame to arrange it out of the way of the wagons while they are being driven on the frame. The pivoted elevator is connected by a rope or cable 21 with the transverse shaft 17, and as the front portion of the wagon is being lifted by reason of the hoisting-ropes 16 being wound around the shaft 17 the pivoted elevator is being lowered by the rope or cable 21 being unwound from the shaft 17. By this construction the wagon and the elevator counterbalance each other practically and enable the shaft 17 to be readily rotated by comparatively-slight exertion. The rope or cable 21, which extends both transversely and longitudinally of the frame when the parts are arranged as shown in Fig. 1, passes around a guide-pulley 22, located at one side of the frame, at the top thereof, and mounted in a suitable block or casing.

The hoisting ropes or cables 16 and the rope or cable 21 are wound around the shaft 17 in reverse directions, so that as the former are wound up the latter will be unwound, and vice versa. The transverse shaft 17 is journaled in suitable bearings 23, and it carries a sprocket-wheel 24, which is connected by a sprocket-chain 25 with a sprocket-wheel 26, mounted in a suitable casing or housing 27 and located at a point below the shaft 17 and within convenient reach of the operator. A crank-handle 28 is secured to the shaft upon which the sprocket-pinion 27 is mounted and is adapted to be rotated to raise and lower the wagon and the elevator. The bearings 23, as indicated in Fig. 1, are bolted to the frame, and they are adapted to be transferred from one end of the same to the other end thereof for the purpose of permitting the elevator to be transferred from end of the frame to the other.

The frame of the transverse conveyer 18 is provided with approximately-triangular sides or wings 29 and is arranged in an inclined position, the upper edges of the wings being located in a horizontal plane and the lower edges being hinged at 30 to the frame of the conveyer. The hinged wings, which are adapted to be let down, are provided at their inner faces with inclined cleats 31, which form a support for a hinged board 32, which is adapted to direct the material to the endless carrier 33 of the conveyer 18. This construction, the wings and the board 32, which is pivoted at its lower end, forms an extension or hopper at the lower end of the transverse conveyer to receive the material as it is dumped from a wagon. The wings are retained in position by means of a pivoted bar 34, disposed transversely of the rear end of the conveyer 18 and provided at its free end with a hook 35 and adapted to be swung around on its pivot 36 to release and engage the wing which is located adjacent to the hook.

The short longitudinal conveyer 19, which is arranged at the upper end of the transverse conveyer 18, is provided with an endless carrier 37, which is connected by bevel-gears 38 and 39 with short horizontal shafts 40, and these bevel-gears 38 and 39 are arranged in pairs at the ends of the frame of the short longitudinal conveyer, at the inner side thereof, as clearly shown in Fig. 4 of the accompanying drawings. The short horizontal shafts 40 are provided at their inner ends with sprocket-pinions 41 and have intermediate sprocket-pinions 41ª, which are adapted to receive a sprocket-chain 42 for connecting either one of the short shafts with the end shaft 43 of the transverse conveyer. The end shaft 43 of the transverse conveyer 18 is provided at its ends with sprocket-pinions 44 for the reception of the said chain 42. The sprocket-pinions 41 at the inner ends of the short horizontal shafts 40 are adapted to receive a chain 45, which is arranged on a counter-shaft 46, and the latter may be provided with a pair of pinions 47, or a single pinion may be employed and may be shifted to bring it in alinement with either of the inner sprocket-pinions 41 of the short horizontal shafts.

The counter-shaft 46 is connected by spur-gears 48 and 49 with a pivot-shaft 50, upon which the elevator 20 is mounted. The pivot-shaft 50 is journaled in suitable bearings of the support 51 of the short longitudinal conveyer 19 and a bracket 52, and the support 51 and the bracket 52 are designed to be detachably bolted to the platform, so that they may be readily removed and secured to any corner thereof. The shaft 50, which forms the pivot of the elevator, is provided with a sprocket-pinion 53, on which is mounted a short sprocket-chain 54, extending through the platform and arranged on one of the sprocket-pinions of a pair of lower longitudinal shafts 55. The longitudinal shafts 55, which are arranged beneath the platform, are journaled in suitable bearings and are provided at their ends with sprocket-pinions 56, and the frame is provided at each corner of the platform with a slot 57 to receive the chain 54. The elevator is adapted to be arranged at any corner of the frame, and the gearing may be readily arranged to operate in any position in which the elevator and the conveyers may be mounted. The longitudinal shafts 55 are connected at the rear end of the frame by a lower transverse shaft 58, beveled gears being provided at the adjacent ends of the shafts 55 and 58, as clearly shown in Fig. 5. One of the shafts 55 is provided at its front end with a spur-pinion 59, which meshes with an outer spur-pinion 60, having a polygonal opening and receiving a sliding rod 61, arranged in a suitable housing 62 and adapted to be drawn outward to form an extensible connection between the apparatus and the power which operates the same, and by drawing the rod or shaft 61 outward the apparatus may be arranged at different distances from the power and may be moved along a bin or crib to fill the same without changing the position of the power; also, one or more rods may be coupled together should it be necessary to move the apparatus a considerable distance from the engine or other motive power.

The elevator, which swings from one side of the frame to the other, extends between the sides of the frame and is composed of upper and lower sections hinged together at their upper edges at 63 and secured in alinement by a rod 64, passing through suitable eyes at the lower edges of the frame of the elevator. By this construction the elevator may be folded, but when transferring the apparatus from one place to another the elevator may be held stationary in a vertical position by means of a fastening device 65, consisting of an eye arranged at one side of the frame of the elevator and a hook located at the adjacent side of the frame, as clearly shown in Fig. 2.

The transverse conveyer is hinged at its upper end to the frame of the longitudinal conveyer by one of its end shafts 43, which is arranged in open bearings 66, and the said transverse conveyer is adapted to be swung upward to permit a vehicle to pass it, and it is designed to be constructed sufficiently light to enable it to be readily raised and lowered by hand for this purpose. The lower end of the elevator is provided with an approximately quadrant-shaped casing 67, forming a hopper or receptacle to receive the material from the longitudinal conveyer.

It will be seen that the apparatus is simple and comparatively inexpensive in construction, that it obviates the necessity of shoveling or scooping grain from a wagon, and that the latter may be readily tilted to the desired height to discharge its contents. The apparatus is also adapted to be operated between cribs or at the outer sides of cribs or bins, and it may be employed for handling ear or shelled corn or other material. Furthermore, it will be apparent that the apparatus may be operated a considerable distance from the power without changing the position thereof and that as the platform is arranged close to the ground a heavy load of grain may be easily drawn upon it.

What is claimed is—

1. In an apparatus of the class described, the combination of a frame, a pivoted elevator adapted to swing across the frame, a transverse shaft, a guide mounted on the frame and located opposite the elevator, a flexible connection connected with the shaft and with the elevator and received by the guide, said flexible connection extending longitudinally and transversely of the frame, the depending flexible connections extending downward from the shaft and adapted to engage a vehicle, and means for rotating the shaft, whereby the elevator and the vehicle are moved simultaneously, substantially as described.

2. In an apparatus of the class described, the combination of a portable frame having a platform, a pivoted elevator adapted to swing across the frame, a transverse conveyer adapted to swing upward and downward to permit a vehicle to pass beneath it, a short longitudinal conveyer connecting the transverse conveyer with the elevator, and means for raising a vehicle, said means being also connected with the elevator, whereby the latter and the vehicle are adapted to counterbalance each other, substantially as described.

3. An apparatus of the class described comprising a frame, a pivoted elevator arranged to swing across the frame and adapted to be raised to permit a vehicle to pass it, a short longitudinal conveyer located at one side of the frame adjacent to the pivoted elevator, and a transverse conveyer arranged adjacent to and extending from the said conveyer and hinged whereby it is adapted to be raised and lowered to permit a vehicle to pass it, substantially as described.

4. An apparatus of the class described comprising a frame having a platform, a pivoted elevator arranged to swing across the frame, a hinged conveyer provided at opposite sides with hinged wings, an inclined board supported by the wings and pivoted at its lower end, means for connecting the wings and a short conveyer connecting the transverse conveyer with the elevator, substantially as described.

5. In a device of the class described, the combination of a frame having a platform, an inclined conveyer hinged at its upper end, wings hinged at opposite sides of the lower end of the conveyer, a pivoted board supported by the wings, and means for holding the wings in operative position, substantially as described.

6. In an apparatus of the class described, the combination of a frame having a platform, the lower longitudinal shafts arranged beneath the platform and geared together, a pivoted elevator adapted to be arranged at any corner of the frame, gearing for connecting the elevator with the adjacent lower longitudinal shaft, and conveyers connected with the elevator, substantially as described.

7. In an apparatus of the class described, the combination of a frame having a platform, longitudinal shafts located beneath the platform, gearing connecting the shafts, an extensible or telescoping rod or shaft slidingly mounted on the frame and connected by gearing with the adjacent longitudinal shaft, an elevator adapted to be arranged at any corner of the frame, and gearing for connecting the elevator with the adjacent longitudinal shaft, substantially as described.

8. In an apparatus of the class described, the combination of a frame having a platform, the longitudinal shafts located beneath the platform and connected by gearing, a pivoted elevator adapted to be arranged at different portions of the frame, gearing for connecting the elevator with the longitudinal shafts, the short longitudinal conveyer, the short horizontal shaft connected by gearing with the longitudinal conveyer, gearing for connecting either of the short horizontal shafts with the elevator, and the transverse conveyer connected with one of the short horizontal shafts, substantially as described.

In testimony that I claim the foregoing as my own I have hereto affixed my signature in the presence of two witnesses.

JOHN ROCKE.

Witnesses:
C. M. COYLE,
H. S. DUNN.